US012722600B2

(12) United States Patent
Sun

(10) Patent No.: US 12,722,600 B2
(45) Date of Patent: Sep. 1, 2026

(54) TERMINAL DEVICE AND METHOD PROCESSING OF DATA FOR TERMINAL DEVICE

(71) Applicant: XIAOMI EV TECHNOLOGY CO., LTD., Beijing (CN)

(72) Inventor: Changyu Sun, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 325 days.

(21) Appl. No.: 18/217,951

(22) Filed: Jul. 3, 2023

(65) Prior Publication Data

US 2024/0317179 A1 Sep. 26, 2024

(30) Foreign Application Priority Data

Mar. 24, 2023 (CN) ........................ 202310308486.4

(51) Int. Cl.
*H04L 9/40* (2022.01)
*B60R 25/01* (2013.01)
*B60R 25/24* (2013.01)

(52) U.S. Cl.
CPC ............ *B60R 25/248* (2013.01); *B60R 25/01* (2013.01); *H04L 63/061* (2013.01)

(58) Field of Classification Search
CPC ..... B60R 25/248; B60R 25/01; H04L 63/061; H04L 2209/80; H04L 9/0838; H04L 9/3247; H04L 9/3268; H04L 63/0823; H04L 2209/16; H04L 2209/84; H04L 9/0897; H04L 9/3265; H04L 9/3263; H04M 1/724098; H04M 1/724092; H04W 4/40; H04W 12/04; H04W 12/06; H04W 12/08; H04W 12/041; G07C 9/00174; G06Q 50/40
See application file for complete search history.

(56) References Cited

U.S. PATENT DOCUMENTS 10,645,578 B2 * 5/2020 Auer ........................ H04B 5/70
2008/0150685 A1 * 6/2008 Desai .................. B60R 25/2081 340/5.61
2017/0104589 A1 4/2017 Lambert et al.

FOREIGN PATENT DOCUMENTS

| | | | | |
|---|---|---|---|---|
| CN | 113301167 A | * | 8/2021 | ......... G07C 9/00896 |
| CN | 114821867 A | * | 7/2022 | ......... G07C 9/00571 |
| DE | 102023104931 A1 | * | 8/2024 | ............ H04W 76/11 |
| KR | 102175408 B1 | * | 11/2020 | ........ H04W 12/0433 |
| KR | 102232966 B1 | * | 3/2021 | ......... G07C 9/00309 |
| KR | 20220096327 A | * | 7/2022 | ........... H04L 63/067 |

(Continued)

OTHER PUBLICATIONS

Chinese Patent Application No. 202310308486.4, Office Action dated Sep. 6, 2023, 5 pages.

(Continued)

*Primary Examiner* — Mohammed Waliullah
(74) *Attorney, Agent, or Firm* — Cozen O'Connor

(57) ABSTRACT

A terminal device includes a communication device, configured to detect whether a native system of the terminal device includes components for adapting a public protocol of a digital vehicle key, and communicating with a target communication party based on the public protocol in case of absence of at least one of the components in the native system, in which the target communication party is a participant of the public protocol.

19 Claims, 7 Drawing Sheets

(56) References Cited

FOREIGN PATENT DOCUMENTS

| | | | | | |
|---|---|---|---|---|---|
| KR | 20250043841 A | * | 3/2025 | ......... | G01S 13/0209 |
| WO | WO 2022127064 A1 | | 6/2022 | | |

OTHER PUBLICATIONS

Chinese Patent Application No. 202310308486.4, English translation of Office Action dated Sep. 6, 2023, 9 pages.
Car Connectivity Consortium "CCC digital key Release 3" Aug. 19, 2022, 12 pages.
Car Connectivity Consortium "CCC digital key Release 3" English translation Aug. 19, 2022, 12 pages.
Japanese Patent Application No. 2023-189599, Office Action with English translation dated Mar. 18, 2025, 6 pages.
Japanese Patent Application No. 2023-189599, Office Action dated Nov. 12, 2024, with English translation, 6 pages.
Indian Patent Application No. 202344072716, Office Action dated Jun. 2, 2026, 7 pages.

* cited by examiner detecting whether a native system of the terminal device comprises components for adapting a public protocol of a digital vehicle key — S91 communicating with a target communication party based on the public protocol in case of absence of at least one of the components in the native system, wherein the target communication party is a participant of the public protocol — S92

FIG. 9

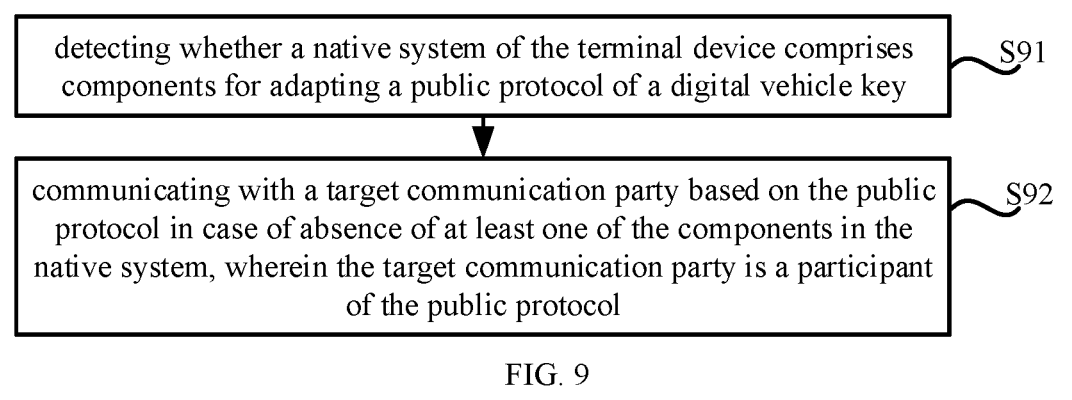

TERMINAL DEVICE AND METHOD PROCESSING OF DATA FOR TERMINAL DEVICE

CROSS REFERENCE TO RELATED APPLICATION

This application is based on and claims priority to Chinese patent application No. 202310308486.4, filed on Mar. 24, 2023, the entire content of which is hereby incorporated into this application by reference.

TECHNICAL FIELD

The disclosure relates to the field of mobile terminal technologies, in particular to a terminal device and a method of processing data for a terminal device.

BACKGROUND

A terminal device used as a vehicle key is a popular technology that has emerged in recent years, such a function is also called a digital vehicle key. Unlike traditional physical vehicle keys, the digital vehicle key enables a user to place a mobile terminal device near a vehicle door to lock and unlock the door. It may also be used to start the vehicle by integrating a vehicle key function in a mobile terminal device.

SUMMARY

According to a first aspect of embodiments the disclosure, a terminal device is provided. The terminal device includes:

a communication device, configured to detect whether a native system of the terminal device comprises components for adapting a public protocol of a digital vehicle key, and communicate with a target communication party based on the public protocol in case of absence of at least one of the components in the native system, in which the target communication party is a participant of the public protocol.

According to a second aspect of embodiments the disclosure, a method of processing data for a terminal device is provided. The method includes:

detecting whether a native system of the terminal device includes components for adapting a public protocol of a digital vehicle key; and communicating with a target communication party based on the public protocol in case of absence of at least one of the components in the native system, in which the target communication party is a participant of the public protocol.

According to a third aspect of embodiments the disclosure, a non-transitory computer-readable storage medium having instructions stored thereon is provided. When the instructions are executed by a processor of a terminal device, a method of processing data is implemented. The method includes:

detecting whether a native system of the terminal device includes components for adapting a public protocol of a digital vehicle key; and communicating with a target communication party based on the public protocol in case of absence of at least one of the components in the native system, in which the target communication party is a participant of the public protocol.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

FIG. 9 is a flowchart of a method of processing data for a terminal device according to an embodiment of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Before introducing a terminal device and a method of processing data for a terminal device of the present disclosure, an application scenario of the present disclosure is introduced firstly.

The terminal device as a vehicle key is a popular technology that has emerged in recent years, and such a function is also called a digital vehicle key. Unlike traditional physical vehicle keys, the digital vehicle key enables functions such as opening a door and starting the vehicle by integrating a vehicle key function in a mobile terminal device.

For example, in some scenarios, a vehicle company can develop a digital vehicle key based on a private protocol. By encapsulating related data of the private protocol in an application of the vehicle company, the terminal device installed with the application can interact with a vehicle and a vehicle server based on the private protocol, to realize functions of the digital vehicle key, such as vehicle control, and key sharing, etc. In order to realize the functions of the digital vehicle key, the application is required to run on the terminal device, such as running on foreground, or keeping alive on background, which consumes more resources of the terminal device. The vehicle server may be a server capable of communicating with a vehicle.

Therefore, some vehicle manufacturers and mobile terminal manufacturers have jointly developed a solution of the digital vehicle key, i.e., a solution of a digital vehicle key based on a public protocol. Compared with the private protocol, the public protocol can realize the functions of the digital vehicle key based on an underlying operating system.

Figure 1:
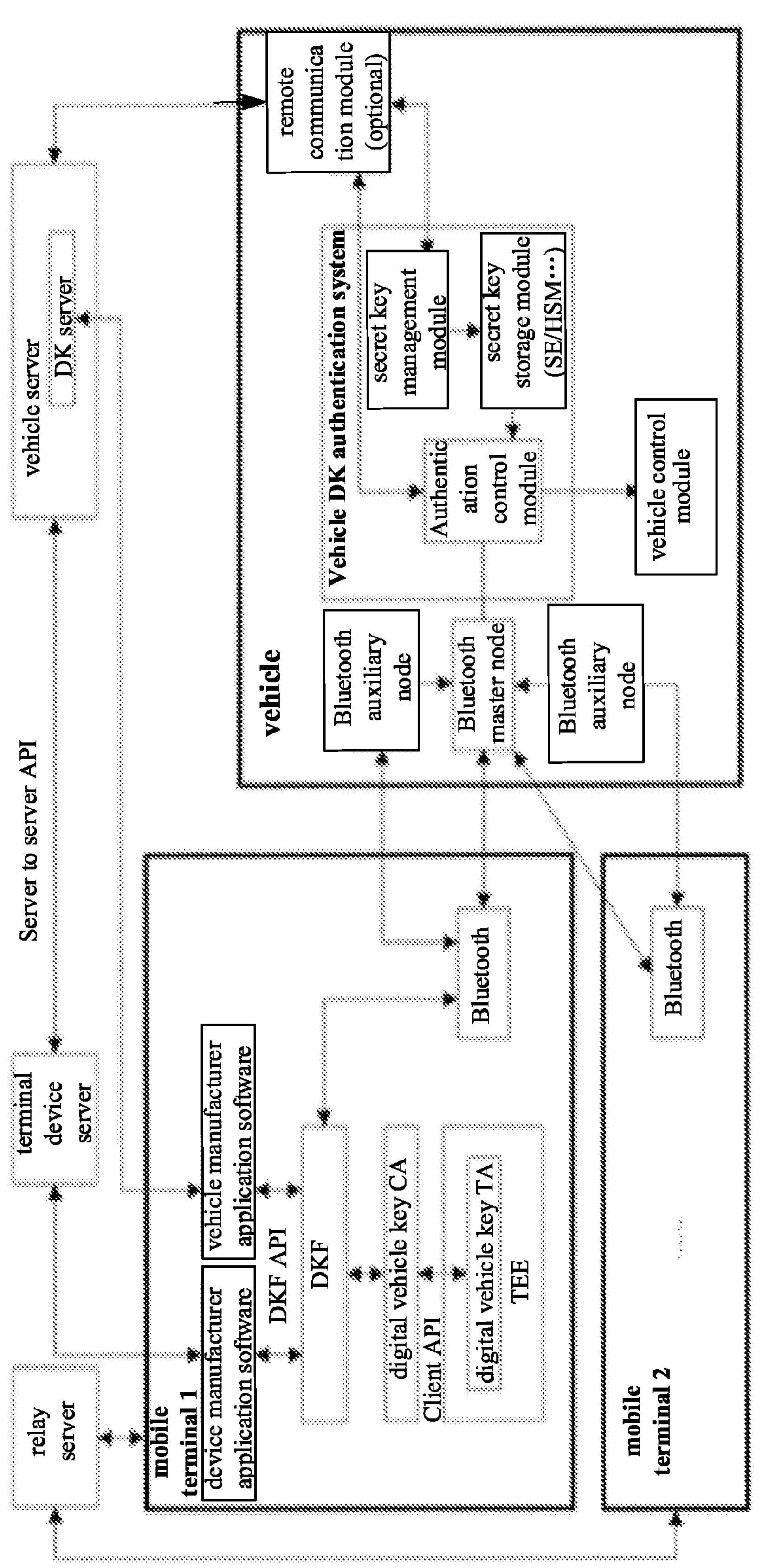
FIG. 1 is a structural diagram of a digital vehicle key system based on an ICCOA protocol according to an embodiment of the present disclosure.

Taking an ICCOA public protocol as an example, FIG. 1 illustrates a structural diagram of a digital vehicle key system based on an ICCOA protocol. In the solution of the digital vehicle key based on the public protocol, related operations of the digital vehicle key can be encapsulated as a digital key framework (DKF). The DKF can provide various Application Programming Interfaces (APIs) for upper-layer applications to call, such as devices pairing, key life cycle management, key unlocking, locking and sharing, and vehicle control, etc. By setting the DKF at the system level, the terminal device can implement the functions of the digital vehicle key based on the underlying operating system, which has advantages of low resource consumption and better user experience.

It should be noted that the public protocol is jointly developed by the vehicle manufacturer and the mobile terminal manufacturer, therefore, there are restrictions on a type of the terminal device. For example, terminal manufacturer A and the vehicle manufacturer jointly develop public protocol 1, so that terminal device A1 of terminal manufacturer A can support public protocol 1. However, for terminal device B1 of terminal manufacturer B, it is difficult to support public protocol 1, which affects the user experience. For example, in some scenarios, users of the vehicle can include an owner and a friend of the owner, but since the owner uses terminal device A1 which supports public protocol 1 and the friend uses terminal device B1 which does not support public protocol 1, so that the owner cannot share the digital vehicle key to the friend.

Therefore, in order to ensure compatibility, vehicle companies generally develop both the solution of the digital vehicle key based on the private protocol and the solution of the digital vehicle key based on the public protocol. Both solutions can be configured in the terminal device, which leads to higher development and deployment costs of digital vehicle key solutions.

Therefore, the disclosure provides a terminal device, which may be a mobile terminal device such as a cell phone, a tablet computer, or any other types of terminal device equipped with digital key functions.

Figure 2:
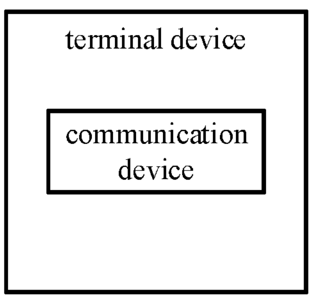
FIG. 2 is a block diagram of a terminal device according to an embodiment of the present disclosure.

FIG. 2 is a block diagram of a terminal device according to an embodiment of the present disclosure. As illustrated in FIG. 2, the terminal device includes a communication device. The communication device is configured to detect whether a native system of the terminal device includes components for adapting a public protocol of a digital vehicle key, and communicate with a target communication party based on the public protocol in case of absence of at least one of the components in the native system, in which the target communication party is a participant of the public protocol.

The native system of the terminal device can be a system that the terminal device is equipped with at a factory. There are various forms of native operating systems for different terminal devices, such as an iOS® system, a HarmonyOS® system, an Android® system, etc., which will not be limited in the disclosure. In order to realize the digital vehicle key based on the public protocol, the terminal device may be configured with related components. These components can include a security unit, a DKF, a trusted execution environment (TEE), etc., and their types can be specifically referred to a relevant description of the public protocol of the digital vehicle key.

The communication device may detect whether the native system of the terminal device includes the components for adapting the public protocol of the digital vehicle key. In case of absence of at least one of the components in the native system, the communication device may communicate with the target communication party based on the public protocol. The target communication party is the participant of the public protocol.

The communication device may be presented in the form of software, hardware, or a combination of software and hardware. For example, in a possible implementation, the communication device may be presented in the form of a software development kit (SDK). The public protocol may be a public protocol based on a certificate system, such as a CCC (Car Connectivity Consortium) protocol or an ICCOA (Intelligent Car Connectivity Open Alliance) protocol. The public protocol may also be a public protocol based on secret key authentication, such as an Intelligent Car Connectivity Industry Ecosystem Alliance Digital Key System (ICCE) protocol.

The communication device is described as following by taking the ICCOA public protocol as an example.

Figure 3:
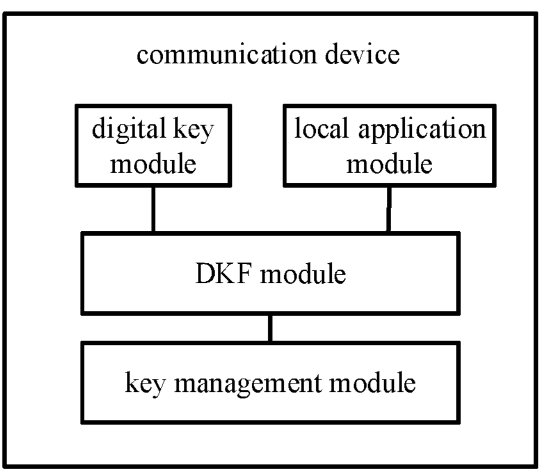
FIG. 3 is a block diagram of a communication device according to an embodiment of the present disclosure.

FIG. 3 is a block diagram of a communication device according to an embodiment of the present disclosure. In a possible implementation, the communication device may include a digital key element. The digital key element is capable of communicating with a vehicle server and is configured to implement functions of a vehicle manufacturer application specified in the public protocol.

The ICCOA protocol specifies that the vehicle manufacturer application needs to provide a functional interface related to the digital vehicle key to the user. Therefore, the related key management function methods can be encapsulated to obtain the digital key element. The key management function methods can include key creation, key sharing, key deletion, Remote Keyless Entry (RKE), etc. The digital key element can also be presented in the form of a SDK and provide an interface of the above key management function methods.

As illustrated in FIG. 3, in a possible implementation, the communication device includes a local application element, configured to implement functions of a terminal device manufacturer application specified in the public protocol.

The local application element is capable of communicating with a terminal device server. In some implementation scenarios, the local application element may be configured to communicate directly with the terminal device server. In some implementation scenarios, a terminal device service element may also be configured in the vehicle server. The local application element is configured to communicate with the terminal device server based on the terminal device service element in the vehicle server. The terminal device server may be a server capable of communicating with a terminal device.

The ICCOA protocol specifies that the application of the terminal device manufacturer needs to provide a functional interface related to the digital vehicle key to the user and performs service processes such as activating, updating, sharing and revoking of the digital vehicle key. Therefore, the above related functional methods can be encapsulated to obtain the local application element. The local application element can also be presented in the form of a SDK and provide an interfaces for the service functions such as activating, updating, sharing and revoking of the vehicle keys.

As illustrated in FIG. 3, in a possible implementation, the communication device includes a DKF element, configured to implement functions of a DKF specified in the public protocol.

For example, operations related to a digital vehicle key Trusted Application (TA) in a digital vehicle key lifecycle can be encapsulated to obtain the DKF element. The DKF element can provide vehicle key management services in the form of an API to the digital key element and the local application element for calling. These functions include but not limited to: devices pairing, key lifecycle management, key unlocking, locking and sharing, vehicle control, etc. The DKF element can also interact with a key management element, so that the key management element can receive and respond to authentication messages sent by vehicles timely.

In addition, the DKF element may be configured to perform Bluetooth pairing and establish Bluetooth connection with the vehicle, and the Bluetooth pairing and connection may be in a general or customized manner. During interaction with the vehicle, the DKF element may also parse and encapsulate a Bluetooth authentication data packet.

As illustrated in FIG. 3, in a possible implementation, the communication device includes a key management element, configured to implement functions of a digital key program specified in the public protocol.

Figure 4:
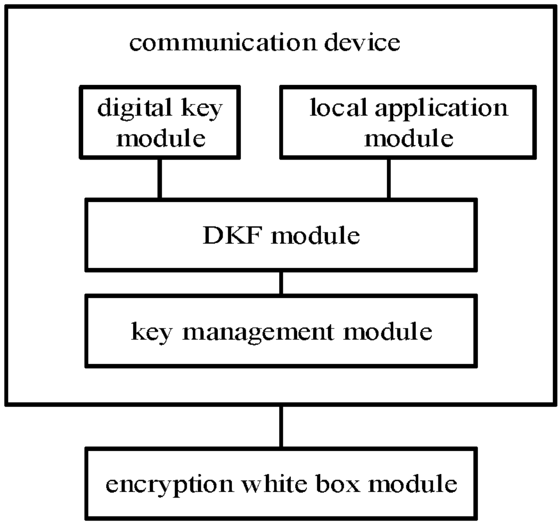
FIG. 4 is a block diagram of a communication device and an encryption white box according to an embodiment of the present disclosure.

The key management element may include a TA element. The TA element may call security capability provided by a secure storage unit, so as to construct and store key data. FIG. 4 is a block diagram of a communication device and an encryption white box according to an embodiment of the present disclosure. In the related art, the key data is stored via a Secure Element (SE), unlike that, the TA element in this disclosure can store the key data by means of encryption white box. In some implementation scenarios, the TA element can also store the key data through a secure storage technology of the native system of the terminal device. For example, in the Android system, the key data can be stored via a key-store (Android secret key) technology.

In addition, the TA element can be used for data encryption, data decryption and security control in the service processes of pairing, unlocking, locking, sharing, and vehicle control, etc. of the digital vehicle key. In some implementation scenarios, the TA element can also be used to verify user identity.

In some implementation scenarios, the TA element may be constructed with a calling interface. The key management element may also include a Client Application (CA) element. The CA element may perform TA related functions by calling the interface of the TA element.

In addition, the communication device may be encapsulated into an application in the terminal, which is not limited in the disclosure.

The terminal device may perform public protocol based communication with the target communication party based on the communication device.

For example, in a possible implementation, the public protocol is a public protocol based on certificate authentication. The terminal device is configured, through the communication device, to communicate with the vehicle server, the terminal device server, and the vehicle, to complete the step of activating the digital vehicle key and obtaining the digital vehicle key.

Figure 5:
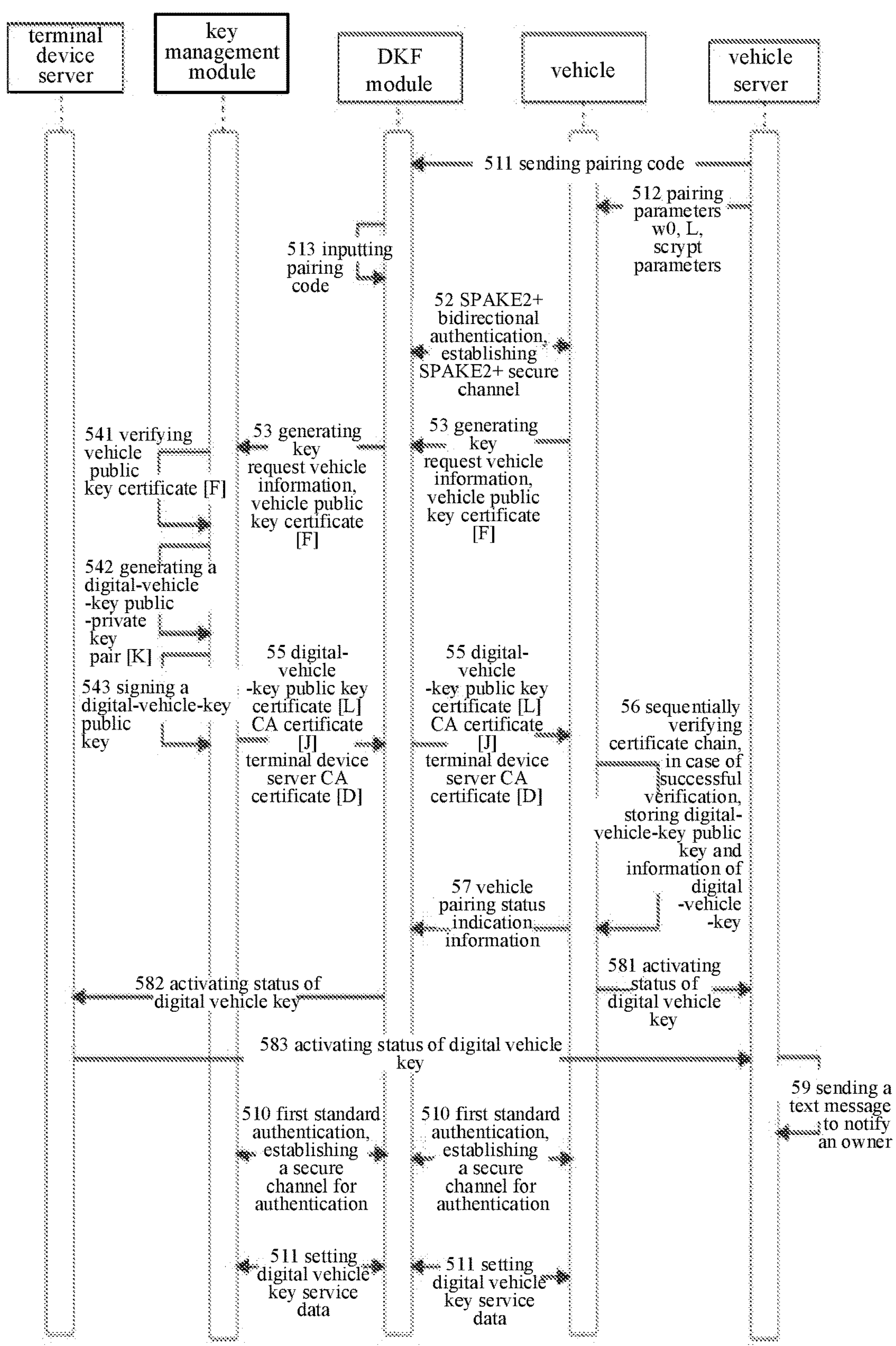
FIG. 5 is a flowchart of activating a digital vehicle key according to an embodiment of the present disclosure.
Figure 6:
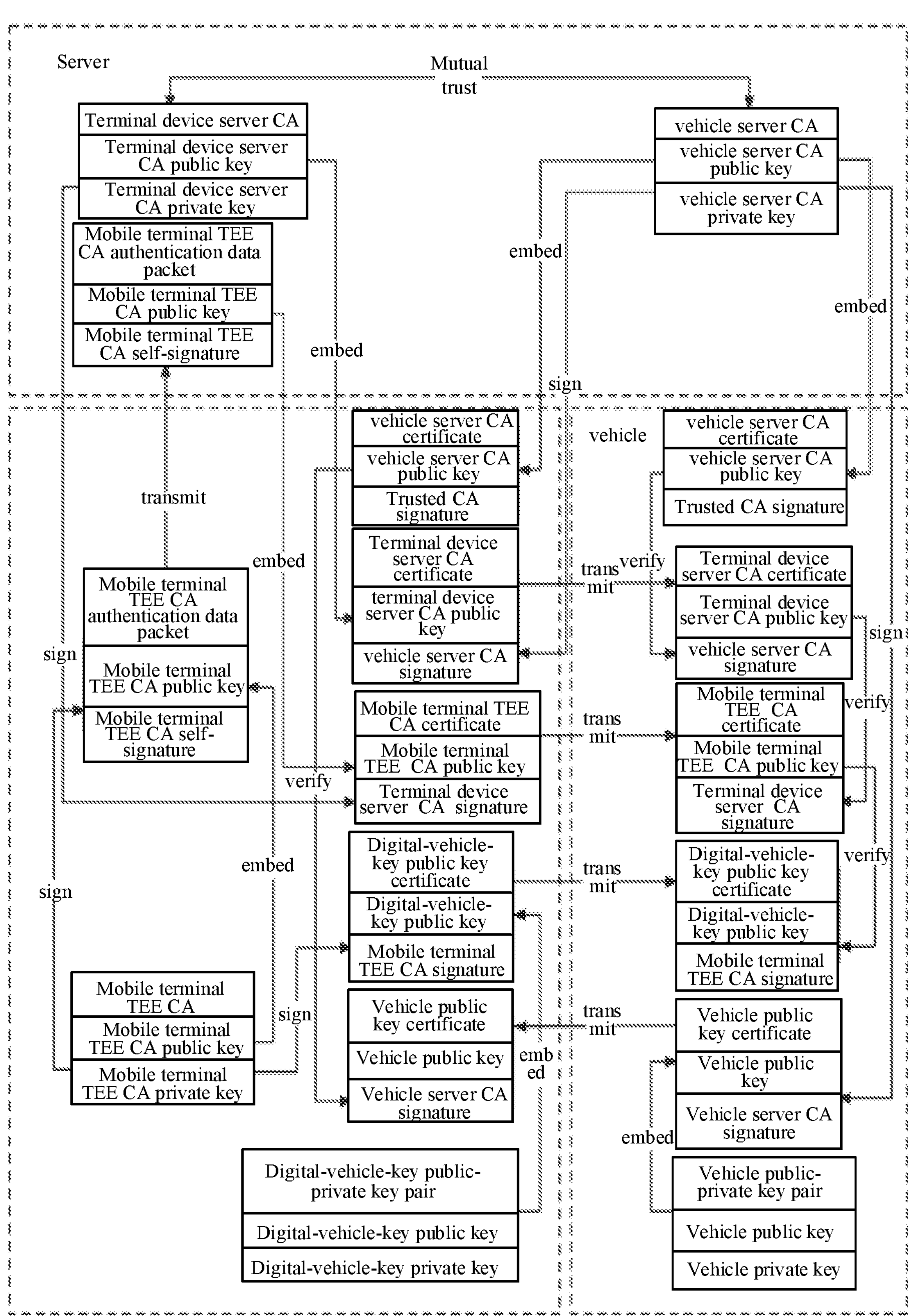
FIG. 6 is a structural diagram of an ICCOA digital vehicle key according to an embodiment of the present disclosure.

FIG. 5 is a flowchart of activating a digital vehicle key according to an embodiment of the present disclosure. FIG. 6 is a structural diagram of an ICCOA digital vehicle key according to an embodiment of the present disclosure. In the disclosure, the process of activating the digital vehicle key based on the ICCOA protocol through the communication device may include the following steps.

At steps 511 to 513, the user may initiate a key activating process through the communication device of the terminal device. The user may input pairing information. The pairing information may be generated by the vehicle server, and the digital key element in the communication device may obtain the pairing information from the vehicle server. It is to be noted that the vehicle server may also send initial pairing parameters to the vehicle.

At step 52, the vehicle terminal can interact with the DKF element of the terminal device, and perform bidirectional authentication with the terminal device based on an SPAKE2+ algorithm, to establish an SPAKE2+ secure channel. When the vehicle has been bound to the terminal device of the vehicle owner, the key activating process will stop. When the vehicle is not bound to the terminal device of the vehicle owner, the subsequent processes may continue based on the SPAKE2+ secure channel.

The vehicle (or terminal device) may also check whether a current state has met a key activating condition. The condition may be set based on application requirements. At step 53, in a case that the key activating condition is satisfied, the vehicle transmits a vehicle public key certificate [F] to the terminal device. The vehicle public key certificate [F] includes a vehicle public key and a vehicle server CA signature.

At steps 541 to 543, the key management element of the terminal device can verify the vehicle public key certificate [F] based on a vehicle server CA certificate [C], which includes a vehicle server CA public key and a trusted CA signature. After successful verification, the terminal device can save the vehicle public key certificate [F]. For example, the terminal device may save the vehicle public key certificate to the encryption white box. In addition, the terminal device can generate a digital-vehicle-key public-private key pair [K], which includes a digital-vehicle-key public key and a digital-vehicle-key private key. The terminal device can also sign the digital-vehicle-key public key based on a key management element certificate [H], to generate a digital-vehicle-key public key certificate [L]. The key management element certificate [H] includes a CA public key and a CA private key of the key management element, and the digital-vehicle-key public key certificate [L] includes the digital-vehicle-key public key and a key management element CA signature.

At step 55, the terminal device sends a terminal device server CA certificate [D], a key management element certificate [J] and the digital-vehicle-key public key certificate [L] to the vehicle sequentially. The terminal device server CA certificate [D] includes a terminal device server CA public key and a vehicle server CA signature. The key management element certificate [J] includes a key management element CA public key and a terminal device server CA signature.

At step 56, the vehicle sequentially verifies a certificate chain transmitted by the terminal device. The vehicle can verify the terminal device server CA certificate [D] via a vehicle server CA certificate [G], which includes a vehicle server CA public key and a trusted CA signature. The vehicle may also verify the key management element certificate [J] via the terminal device server CA certificate [D], which includes a terminal device server CA public key and a vehicle server CA signature. The vehicle can also verify the digital-vehicle-key public key certificate [L] by the key management element certificate [J].

In case of successful verification, the vehicle can save the digital-vehicle-key public key and corresponding information of the digital vehicle key. In this way, the terminal device verifies and saves the vehicle public key, which completes generation and verification steps of a secret key for an owner's key pairing stage. At this time, the terminal device and the vehicle are successfully paired.

At step 57, the vehicle sends a status indication to the terminal device for indicating a pairing status of the digital vehicle key of the vehicle.

At steps 581 to 583, the vehicle synchronizes an activating status of the digital vehicle key of the vehicle to the vehicle server, and the terminal device sends an activating status of the digital vehicle key of the terminal device to the terminal device server. The terminal device server synchronizes the activating status of the digital vehicle key to the vehicle server.

At step 59, the vehicle server sends a key activating message to notify the owner of the vehicle.

At step 510, first standard authentication is performed between the terminal device and the vehicle, and a standard authentication secure channel is established.

At step 511, in response to a demand on setting digital vehicle key service data, the vehicle sends a request of saving the digital vehicle key service data to the terminal device.

With the above technical solutions, for the terminal device whose native system does not support the ICCOA protocol, it is possible to validate the digital vehicle key that is based on the ICCOA protocol through the communication device, thereby expanding the scope of application of the ICCOA protocol.

In a possible implementation, the public protocol is a public protocol based on certificate authentication. The target communication party includes a vehicle server and a terminal device server. The terminal device is configured to, in response to receiving a key sharing request, communicate with the vehicle server via the digital key element and communicate with the terminal device server via the local application element, rendering that an authentication step for key sharing is completed, and a shared digital vehicle key is obtained. In some implementation scenarios, the terminal device can also act as an initiator of key sharing (i.e., terminal device of the owner) and share the digital vehicle key to another terminal device.

The following is an illustration for a process of sharing the digital vehicle key.

Figure 7:
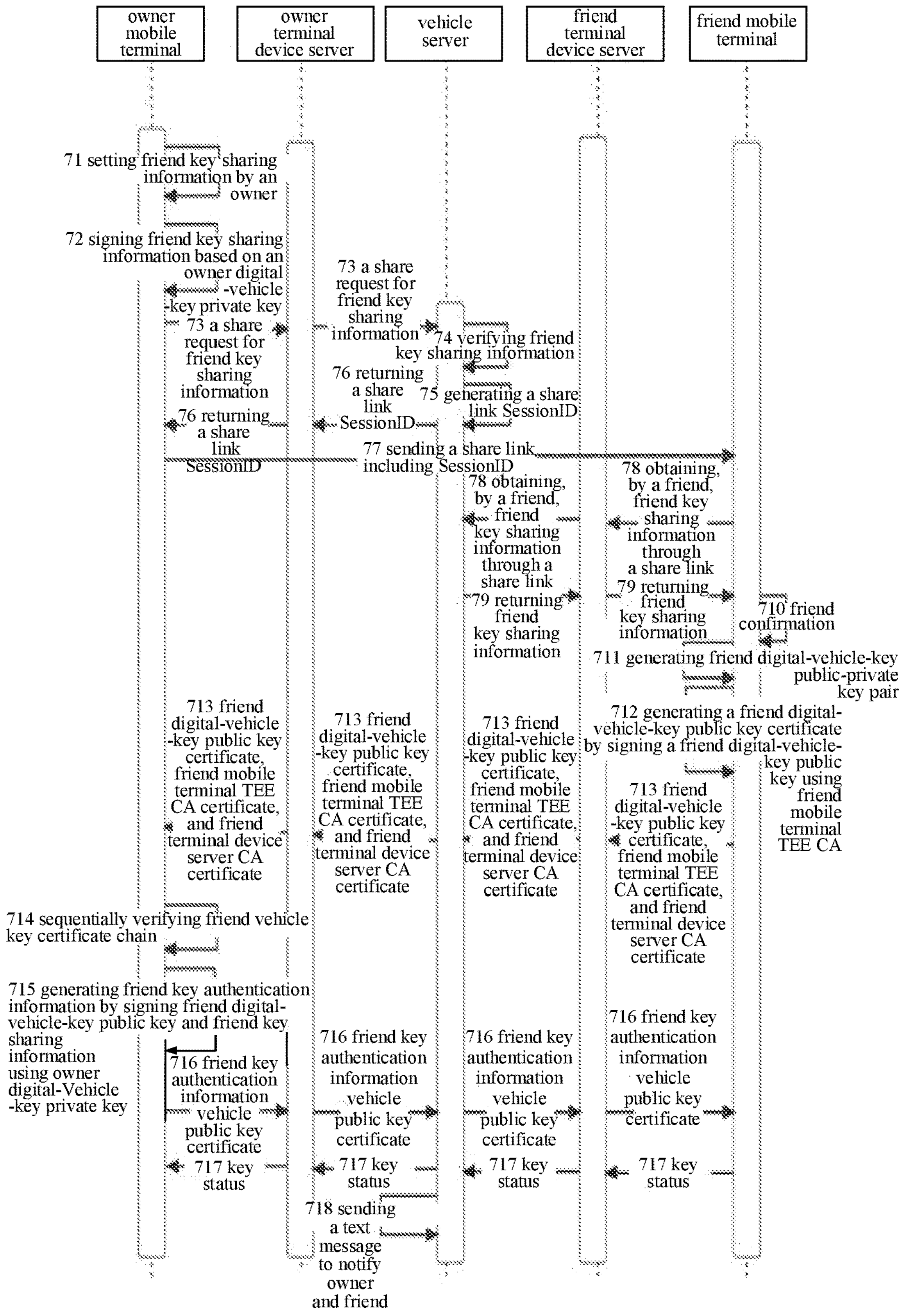
FIG. 7 is a flowchart of key sharing according to an embodiment of the present disclosure.

FIG. 7 is a flowchart of key sharing according to an embodiment of the present disclosure. As illustrated in FIG. 7, a process of key sharing includes the following steps.

At step 71, a user can set friend key sharing information, such as a validity period, a permission and other information. In a case that the native system of an owner terminal device, e.g., a terminal device of a vehicle owner, supports the ICCOA protocol, the user can set the friend key sharing information in an application of a terminal device manufacturer of the owner terminal device, the application of the terminal device manufacturer can be, for example, a wallet application. In a case that the native system of the owner terminal device does not support the ICCOA protocol, the user may set the friend key sharing information via the communication device.

At step 72, the owner terminal device signs the friend key sharing information based on an owner digital-vehicle-key private key and generates a friend key sharing request.

At step 73, the owner terminal device sends the friend key sharing request to an owner terminal device server, and the owner terminal device server forwards the sharing request to the vehicle server.

At step 74, the vehicle server receives the sharing request and verifies a signature of the sharing information based on the owner digital-vehicle-key public key.

At step 75, after the vehicle server successfully verifies the signature of the sharing information, the vehicle server generates an SessionID for a share link. The SessionID may be randomly generated by a random number generator to avoid a risk of incremental prediction.

At step 76, the vehicle server sends the SessionID for the share link to the owner terminal device server, and the owner terminal device server forwards the SessionID for the share link to the owner terminal device.

At step 77, after receiving the SessionID for the share link, the owner terminal device generates a share link including the SessionID, such that the owner may share the share link with a friend.

At step 78, the friend may open the share link through a friend terminal device, e.g., a terminal device of the friend. In a case that a native system of the friend terminal device supports the ICCOA protocol, the friend terminal device may jump to the application of the terminal device manufacturer and obtain the friend key sharing information from a friend terminal device server based on the SessionID. The friend terminal device server may obtain the friend key sharing information from the vehicle server. In addition, in a case that the native system of the friend terminal device does not support the ICCOA protocol, the digital key element may obtain the friend key sharing information from the friend terminal device server according to the SessionID when the friend terminal device opens the share link.

At step 79, the vehicle server sends the friend key sharing information to the friend terminal device server, and the friend terminal server forwards the friend key sharing information to the friend terminal device.

At step 710, the friend terminal device prompts related information of friend key sharing and continues after the user confirms the related information. When the current friend terminal device already has a key for the corresponding vehicle, the current friend terminal device may stop the key sharing process and prompts a corresponding message.

At step 711, the friend terminal device generates a public key-private key pair of a friend digital vehicle key.

At step 712, in a case where the native system of the friend terminal device supports the ICCOA protocol, the friend terminal device may generate a friend digital-vehicle-key public key certificate by signing the generated friend digital-vehicle-key public key based on a trusted execution environment CA. In a case that the native system of the friend terminal device does not support the ICCOA protocol, the friend terminal device may generate the friend digital-vehicle-key public key certificate by signing the generated friend digital-vehicle-key public key based on the key management element in the communication device.

At step 713, the friend terminal device initiates a transmission request to the friend terminal device server, with transmission contents including the friend digital-vehicle-key public key certificate, the friend terminal device TEE CA certificate (or the key management element CA certificate when the native system of the friend terminal device does not support the ICCOA protocol, and the key management element CA certificate is obtained by signing the key management element CA public key using the friend terminal server CA private key) and the friend terminal device server CA certificate. The friend terminal device server forwards the transmission contents to the vehicle server, and the vehicle server forwards the transmission contents to the owner terminal device server. After that, the owner terminal device server forwards the transmission contents to the owner terminal device.

At step 714, after receiving the above transmission contents, the owner terminal device may verify the friend terminal device server CA certificate with the vehicle server CA certificate stored in the owner terminal device, and verify the friend terminal device TEE CA certificate with the friend terminal device server CA certificate, and then verify the friend digital-vehicle-key public key certificate with the friend terminal device TEE CA certificate.

Alternatively, in a case that the transmission contents include the friend digital-vehicle-key public key certificate, the key management element CA certificate and the friend terminal device server CA certificate, the owner terminal device may verify the friend terminal device server CA certificate with the vehicle server CA certificate, and further verify the key management element CA certificate with the friend terminal device server CA certificate, and then verify the friend digital-vehicle-key public key certificate with the key management element CA certificate.

At step 715, after confirming that the above certificate chain is successfully verified, the owner terminal device may obtain a friend digital-vehicle-key public key. In this way, the owner terminal device may sign the friend key sharing information and the friend digital-vehicle-key public key by using the owner digital-vehicle-key private key, and generates friend key authentication information.

At step 716, the owner terminal device initiates a transmission request to the owner terminal device server, and the transmission contents may include the friend key authentication information and the vehicle public key certificate. The owner terminal device server forwards the transmission contents to the vehicle server, and the vehicle server further forwards the transmission contents to the friend terminal device server, and then the friend terminal device server forwards the transmission contents to the friend terminal device.

At step 717, after receiving the friend key authentication information and the vehicle public key certificate, the friend terminal device saves the friend key authentication information and the vehicle public key certificate. The friend key authentication information is used for a first standard authentication between the friend key and the vehicle, and is deleted after the authentication is completed. By this way, activating of the friend key is completed.

The friend terminal device may further synchronize a status of the friend key to the friend terminal device server, and the friend terminal device server further synchronizes the status of the friend key to the vehicle server, and then the vehicle server synchronizes the status of the friend key to the owner terminal device server. After that, the owner terminal device server synchronizes the status of the friend key to the owner terminal device.

At step 718, the vehicle server records and tracks the status change of the friend's key, and notifies the owner and the friend in a form of text message.

With the above technical solution, it is possible to perform the process of sharing the digital vehicle key based on the communication device even for the terminal device whose native system does not support the ICCOA protocol, thereby expanding the scope of application of the ICCOA protocol.

In a possible implementation, the target communication party includes a vehicle. The terminal device is configured to establish a secure channel by performing public protocol based communication with the vehicle through the communication device, and send a target control instruction to the vehicle through the secure channel. The target control instruction is configured to control the vehicle to implement a target action.

For example, after the digital vehicle key is activated, the terminal device can use the digital vehicle key. When using the digital vehicle key, the terminal device may authenticate with the vehicle based on the communication device.

The authentication process may include standard authentication or may include fast authentication. During the standard authentication, the vehicle may verify legitimacy of a digital vehicle key of a mobile terminal based on a pre-stored digital-vehicle-key public key. During the fast authentication, the vehicle verify the legitimacy of the digital vehicle key of the mobile terminal based on a fast authentication secret key generated and stored in the last standard authentication.

Figure 8:
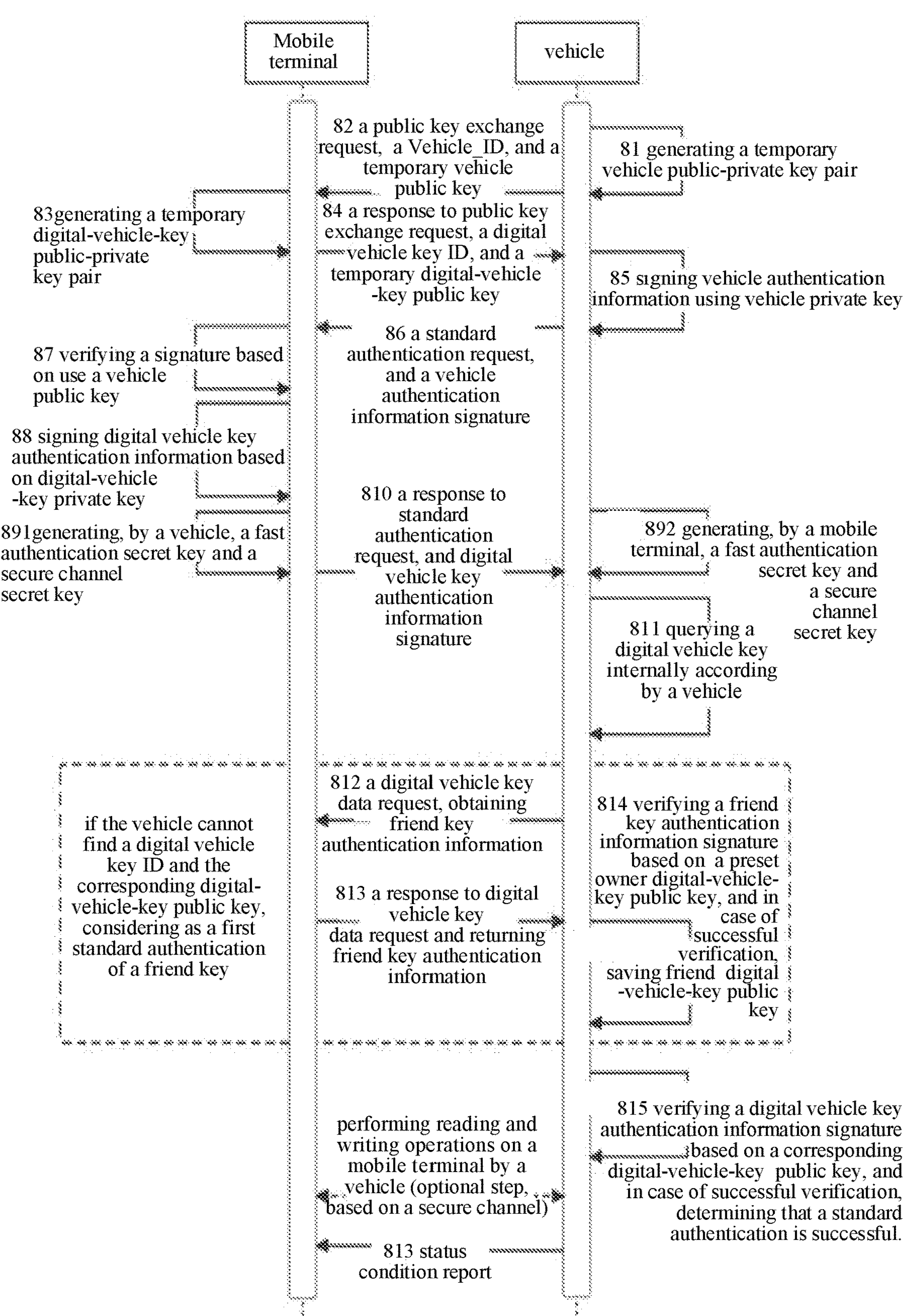
FIG. 8 is a flowchart of standard authentication of a mobile terminal and a vehicle according to an embodiment of the present disclosure.

FIG. 8 is a flowchart of standard authentication of a mobile terminal and a vehicle according to an embodiment of the present disclosure. As illustrated in FIG. 8, the standard verification process includes the following steps.

At step 81, the vehicle generates a temporary vehicle public-private key pair.

At step 82, the vehicle sends a public key exchange request to the mobile terminal, and transmits a temporary vehicle public key and a vehicle ID (Vehicle_ID). A generation rule of Vehicle_ID can refer to the ICCOA protocol.

At step 83, the mobile terminal generates a temporary digital-vehicle-key public-private key pair. For example, the mobile terminal may generate a temporary public-private key pair through the key management element.

At step 84, the mobile terminal sends to the vehicle a response to public key exchange request and returns the temporary digital-vehicle-key public key and the digital vehicle key ID (KeyID). A generation rule of KeyID can refer to the ICCOA protocol.

At step 85, the vehicle generates vehicle authentication information, and the vehicle authentication information includes the temporary digital-vehicle-key public key, the temporary vehicle public key, and related information of KeyID. The vehicle may also sign the vehicle authentication information based on the vehicle private key.

At step 86, the vehicle sends a standard authentication request to the mobile terminal and transmits a vehicle authentication information signature to the mobile terminal.

At step 87, the mobile terminal verify the signature based on the vehicle public key, and the vehicle public key certificate has been issued to the mobile terminal in the key activating process. In this way, the mobile terminal can verify the signature of the vehicle by the vehicle public key, thereby verifying an identity of the vehicle and preventing counterfeit vehicles from obtaining information of the mobile terminal.

At step 88, in a case that the vehicle authentication information signature is verified successfully, the mobile terminal generates digital-vehicle-key authentication information, which can include the temporary digital-vehicle-key public key, the temporary vehicle public key and information related to the vehicle ID. After that, the mobile terminal can sign the digital-vehicle-key authentication information based on the digital-vehicle-key private key.

At steps 891 and 892, the mobile terminal generates a secure channel secret key and a fast authentication secret key using a KDF (key derivation function) algorithm based on a negotiated symmetric secret key. The vehicle terminal generates a secure channel secret key and a fast authentication secret key using the same secret key negotiation algorithm and the KDF algorithm. Both parties establish a secure channel based on the same secure channel secret key.

At step 810, the mobile terminal sends, based on the secure channel established, to the vehicle a response to standard authentication request and transmits to the vehicle the digital-vehicle-key authentication information signature.

At step 811, the vehicle queries the digital vehicle key ID internally according to the digital vehicle key ID transmitted by the mobile terminal, to obtain the digital-vehicle-key public key corresponding to the digital vehicle key ID. When the vehicle can query the digital-vehicle-key public key, step 815 is executed. When the vehicle cannot query the digital vehicle key ID and the corresponding digital-vehicle-key public key, the vehicle executes steps 812 to 814 based on the established secure channel, and the vehicle obtains the digital-vehicle-key public key of the friend key through steps 812 to 814.

At step 812, the vehicle sends a digital vehicle key data request to the mobile terminal, the digital vehicle key data request is used to obtain the friend key authentication information.

At step 813, the mobile terminal sends to the vehicle a response to digital vehicle key data request and returns the friend key authentication information.

At step 814, after the vehicle decrypt the friend key authentication information based on the secure channel secret key, the vehicle verifies a signature of the friend key authentication information based on an owner digital-vehicle-key public key. In response to the verification being successful, a friend digital-vehicle-key public key in the friend key authentication information is saved.

At step 815, the vehicle verifies the digital-vehicle-key authentication information signature transmitted by the mobile terminal based on the digital-vehicle-key public key corresponding to the digital vehicle key ID. In response to the verification being successful, the standard authentication is successful. After the standard authentication is passed, the vehicle and the mobile terminal may synchronously save the fast authentication secret key generated this time for subsequent fast authentication. For example, the mobile terminal may save the fast authentication secret key to an encryption white box element.

At step 816, after successful authentication, the vehicle sends a status condition report to the mobile terminal, to inform the mobile terminal of an authentication status of the vehicle. In some implementation scenarios, before sending the status condition report, the vehicle may perform reading and writing operations on service data of the mobile terminal based on the secure channel having been established already.

After the standard authentication, the mobile terminal may transmit an instruction based on the secure channel established to control the vehicle.

The above described embodiment provides an illustratively example of the manner in which the mobile terminal of the disclosure performs public protocol communication, by taking key activating, key sharing and key use as examples. However, those skilled in the art should know that the mobile terminal provided by the disclosure can perform various public protocol based communications based on the communication device and achieve the corresponding functions. These functions include, but are not limited to, key activating, key sharing, key use, key revocation, and the like.

In addition, the implementation of the mobile terminal provided by the disclosure is illustrated in the above-mentioned embodiments by taking the ICCOA protocol as an example. However, in other implementation scenarios, the public protocol can also be a CCC protocol, or an ICCE protocol, etc.

For example, in the ICCE protocol, the digital key element in the communication device is able to communicate with the vehicle server, and is configured to implement functions of a vehicle manufacturer application specified in the public protocol. These functions can include: providing a user interface for key management and querying, providing an interaction channel between the key and the vehicle server, performing service processes such as activating, updating, sharing, and revoking, etc., pairing and connecting with a vehicle Bluetooth/Ultra Wide Band (UWB) during the key activating phase, transmitting instructions to the key management element through an API provided by the DKF, etc. Therefore, the above functional methods can be encapsulated to obtain the digital key element. The digital key element can be presented in a form of SDK and provides interfaces for the above mentioned functions.

The local application element of the communication device is capable of communicating with the terminal device server, and is configured to implement functions of a terminal device manufacturer application specified in the public protocol. These functions may include: providing a functional user interface related to the digital vehicle key, interacting with the vehicle server, performing service processes such as activating, updating, sharing and revoking, etc., and triggering state synchronization with the vehicle server after completing operations of changing a key life cycle state, etc. Therefore, the above related functional methods can be encapsulated to obtain the local application element. The local application element can also be presented in a form of SDK and provides interfaces for the above mentioned functions.

The DKF element of the communication device is configured to implement functions of the DKF specified in the public protocol. These functions include devices pairing, and vehicle key distribution and management. The DKF element may also interact with the digital vehicle key program, so that the key management element can receive and respond in a timely manner to an authentication message sent by the vehicle. The DKF element may also perform access control for the API of the key management element and maintain rules for access control.

The key management element is configured to implement functions of a digital key program specified in the public protocol. For example, the key management element may provide a secure transaction function based on the encryption white box. In addition, to meet a requirement of carrying more than one vehicle key, an instance of the key management element may use a unified Application Identifier (AID), ensure isolation of key data from different manufacturers, and block unauthorized query requests.

Based on the communication device, the terminal device may perform the ICCE protocol based communication with the target communication party, and the communication manner may refer to the ICCE protocol, which will not be repeated in the present disclosure for the sake of brevity of the specification. Similarly, the communication device may be used to implement functions of the terminal device specified in the CCC protocol. The communication device is configured to establish CCC protocol based communication between the terminal device and the target communication party, which is not repeated in the present disclosure.

Based on the same inventive concept, the disclosure also provides a method for processing data, performed by a terminal device provided in the disclosure. FIG. 9 is a flowchart of a method for processing data for a terminal device according to an embodiment of the present disclosure. As illustrated in FIG. 9, the method includes the following steps.

At step S91, the terminal device detects whether a native system of the terminal device includes components for adapting a public protocol of a digital vehicle key.

At step S92, the terminal device communicates with a target communication party based on the public protocol in case of absence of at least one of the components in the native system, in which the target communication party is a participant of the public protocol.

For example, in a possible implementation, the public protocol is a public protocol based on certificate authentication, the target communication party includes a vehicle server and a terminal device server, and communicating with the target communication party based on the public protocol includes:

communicating with the vehicle server, the terminal device server, and the vehicle via the communication device, so that the step of activating the digital vehicle key specified in the public protocol is completed, and the digital vehicle key is obtained.

As illustrated in FIG. 5 and FIG. 6, in the disclosure, a process of activating the digital vehicle key based on the ICCOA protocol by the communication device includes the following steps.

At step 511 to step 513, the user may initiate a key activating process through the communication device of the terminal device. The user may input pairing information. The pairing information may be generated by the vehicle server, and the digital key element in the communication device may obtain the pairing information from the vehicle server. It is to be noted that the vehicle server may also send initial pairing parameters to the vehicle.

At step 52, the vehicle terminal can interact with the DKF element of the terminal device, and perform bidirectional authentication with the terminal device based on an SPAKE2+ algorithm, to establish an SPAKE2+ secure channel. When the vehicle has been bound to the terminal device of the vehicle owner, the key activating process will stop. When the vehicle is not bound to the terminal device of the vehicle owner, the subsequent process continues based on the SPAKE2+ secure channel.

The vehicle (or terminal device) may also check whether a current state has met a key activating condition. The condition may be set based on application requirements. At step 53, in a case that the key activating condition is satisfied, the vehicle transmits a vehicle public key certificate [F] to the terminal device. The vehicle public key certificate [F] includes a vehicle public key and a vehicle server CA signature.

At steps 541 to 543, the key management element of the terminal device can verify the vehicle public key certificate [F] based on a vehicle server CA certificate [C], which includes a vehicle server CA public key and a trusted CA signature. After successful verification, the terminal device can save the vehicle public key certificate [F]. For example, the terminal device may save the vehicle public key certificate to the encryption white box. In addition, the terminal device can generate a digital-vehicle-key public-private key pair [K], which includes a digital-vehicle-key public key and a digital-vehicle-key private key of the. The terminal device can also sign the digital-vehicle-key public key based on a key management element certificate [H], to generate a digital-vehicle-key public key certificate [L]. The key management element certificate [H] includes a CA public key and a CA private key of the key management element, and the digital-vehicle-key public key certificate [L] includes the digital-vehicle-key public key and a key management element CA signature.

At step 55, the terminal device sends a terminal device server CA certificate [D], a key management element certificate [J] and the digital-vehicle-key public key certificate [L] to the vehicle sequentially. The terminal device server CA certificate [D] includes a terminal device server CA public key and a vehicle server CA signature. The key management element certificate [J] includes a key management element CA public key and a terminal device server CA signature.

At step 56, the vehicle sequentially verifies a certificate chain transmitted by the terminal device. The vehicle can verify the terminal device server CA certificate [D] via a vehicle server CA certificate [G], which includes a vehicle server CA public key and a trusted CA signature. The vehicle may also verify the key management element certificate [J] via the terminal device server CA certificate [D], which includes a terminal device server CA public key and a vehicle server CA signature. The vehicle can also verify the digital-vehicle-key public key certificate [L] by the key management element certificate [J].

In case of successful verification, the vehicle can save the digital-vehicle-key public key and corresponding information of the digital vehicle key. In this way, the terminal device verifies and saves the vehicle public key, which completes generation and verification steps of the secret key for an owner's key pairing stage. At this time, the terminal device and the vehicle are successfully paired.

At step 57, the vehicle sends a status indication to the terminal device for indicating a pairing status of the digital vehicle key of the vehicle.

At steps 581 to 583, the vehicle synchronizes an activating status of the digital vehicle key of the vehicle to the vehicle server, and the terminal device sends an activating status of the digital vehicle key of the terminal device to the terminal device server. The terminal device server synchronizes the activating status of the digital vehicle key to the vehicle server.

At step 59, the vehicle server sends a key activating message to notify the owner of the vehicle.

At step 510, first standard authentication is performed between the terminal device and the vehicle, and a standard authentication secure channel is established.

At step 511, in response to a demand to set digital vehicle key service data, the vehicle sends a request of saving the digital vehicle key service data to the terminal device.

With the above technical solutions, for the terminal device whose native system does not support the ICCOA protocol, it is possible to validate the digital vehicle key that is based on the ICCOA protocol through the communication device, thereby expanding the scope of application of the ICCOA protocol.

In a possible implementation, the public protocol is a public protocol based on certificate authentication, the target communication party includes a vehicle server and a terminal device server, and communicating with the target communication party based on the public protocol includes:

in response to receiving a key sharing request, communicating with the vehicle server via a digital key element in a communication device, and communicating with the terminal device server via a local application element in the communication device, rendering that an authentication step for key sharing is completed, and a shared digital vehicle key is obtained.

As illustrated in FIG. 7, a process of key sharing includes the following steps.

At step 71, a user can set friend key sharing information, such as a validity period, a permission and other information. In a case that the native system of an owner terminal device, e.g., a terminal device of a vehicle owner, supports the ICCOA protocol, the user can set the friend key sharing information in an application of a terminal device manufacturer of the owner terminal device, the application of the terminal device manufacturer can be, for example, a wallet application. In a case that the native system of the owner terminal device does not support the ICCOA protocol, the user may set the friend key sharing information via the communication device.

At step 72, the owner terminal device signs the friend key sharing information based on an owner digital-vehicle-key private key and generates a friend key sharing request.

At step 73, the owner terminal device sends the friend key sharing request to an owner terminal device server, and the owner terminal device server forwards the sharing request to the vehicle server.

At step 74, the vehicle server receives the sharing request and verifies a signature of the sharing information based on the owner digital-vehicle-key public key.

At step 75, after the vehicle server successfully verifies the signature of the sharing information, the vehicle server generates an SessionID for a share link. The SessionID may be randomly generated by a random number generator to avoid a risk of incremental prediction.

At step 76, the vehicle server sends the SessionID for the share link to the owner terminal device server, and the owner terminal device server forwards the SessionID for the share link to the owner terminal device.

At step 77, after receiving the SessionID for the share link, the owner terminal device generates a share link including the SessionID, such that the owner may share the share link with a friend.

At step 78, the friend may open the share link through a friend terminal device, e.g., a terminal device of the friend. In a case that a native system of the friend terminal device supports the ICCOA protocol, the friend terminal device may jump to the application of the terminal device manufacturer and obtain the friend key sharing information from a friend terminal device server based on the SessionID. The friend terminal device server may obtain the friend key sharing information from the vehicle server. In addition, in a case that the native system of the friend terminal device does not support the ICCOA protocol, the digital key element may obtain the friend key sharing information from the friend terminal device server according to the SessionID when the friend terminal device opens the share link.

At step 79, the vehicle server sends the friend key sharing information to the friend terminal device server, and the friend terminal server forwards the friend key sharing information to the friend terminal device.

At step 710, the friend terminal device prompts related information of friend key sharing and continues after the user confirms the related information. When the current friend terminal device already has a key for the corresponding vehicle, the current friend terminal device may stop the key sharing process and prompts a corresponding message.

At step 711, the friend terminal device generates a public key-private key pair of a friend digital vehicle key.

At step 712, in a case where the native system of the friend terminal device supports the ICCOA protocol, the friend terminal device may generate a friend digital-vehicle-key public key certificate by signing the generated friend digital-vehicle-key public key based on a trusted execution environment CA. In a case that the native system of the friend terminal device does not support the ICCOA protocol, the friend terminal device may generate the friend digital-vehicle-key public key certificate by signing the generated friend digital-vehicle-key public key based on the key management element in the communication device.

At step 713, the friend terminal device initiates a transmission request to the friend terminal device server, with transmission contents including the friend digital-vehicle-key public key certificate, the friend terminal device TEE CA certificate (or the key management element CA certificate when the native system of the friend terminal device does not support the ICCOA protocol, and the key management element CA certificate is obtained by signing the key management element CA public key using the friend terminal server CA private key) and the friend terminal device server CA certificate. The friend terminal device server forwards the transmission contents to the vehicle server, and the vehicle server forwards the transmission contents to the owner terminal device server. After that, the owner terminal device server forwards the transmission contents to the owner terminal device.

At step 714, after receiving the above transmission contents, the owner terminal device may verify the friend terminal device server CA certificate with the vehicle server CA certificate stored in the owner terminal device, and verify the friend terminal device TEE CA certificate with the friend terminal device server CA certificate, and then verify the friend digital-vehicle-key public key certificate with the friend terminal device TEE CA certificate.

Alternatively, in a case that the transmission contents include the friend digital-vehicle-key public key certificate, the key management element CA certificate and the friend terminal device server CA certificate, the owner terminal device may verify the friend terminal device server CA certificate with the vehicle server CA certificate, and further verify the key management element CA certificate with the friend terminal device server CA certificate, and then verify the friend digital-vehicle-key public key certificate with the key management element CA certificate.

At step 715, after confirming that the above certificate chain is successfully verified, the owner terminal device may obtain a friend digital-vehicle-key public key. In this way, the owner terminal device may sign the friend key sharing information and the friend digital-vehicle-key public key by using the owner digital-vehicle-key private key, and generates friend key authentication information.

At step 716, the owner terminal device initiates a transmission request to the owner terminal device server, and the transmission contents may include the friend key authentication information and the vehicle public key certificate. The owner terminal device server forwards the transmission contents to the vehicle server, and the vehicle server further forwards the transmission contents to the friend terminal device server, and then the friend terminal device server forwards the transmission contents to the friend terminal device.

At step 717, after receiving the friend key authentication information and the vehicle public key certificate, the friend terminal device saves the friend key authentication information and the vehicle public key certificate. The friend key authentication information is used for a first standard authentication between the friend key and the vehicle, and is deleted after the authentication is completed. By this way, activating of the friend key is completed.

The friend terminal device may further synchronize a status of the friend key to the friend terminal device server, and the friend terminal device server further synchronizes the status of the friend key to the vehicle server, and then the vehicle server synchronizes the status of the friend key to the owner terminal device server. After that, the owner terminal device server synchronizes the status of the friend key to the owner terminal device.

At step 718, the vehicle server records and tracks the status change of the friend key, and notifies the owner and the friend in a form of text message.

With the above technical solution, it is possible to perform the process of sharing the digital vehicle key based on the communication device even for the terminal device whose native system does not support the ICCOA protocol, thereby expanding the scope of application of the ICCOA protocol.

In a possible implementation, the target communication party includes a vehicle, and communicating with the target communication party based on the public protocol includes:

- establishing a secure channel based on communication between the vehicle and the communication device according to the public protocol; and
- sending a target control instruction to the vehicle by the secure channel, wherein the target control instruction is configured to control the vehicle to perform a target action.

FIG. 8 is a flowchart of standard authentication of a mobile terminal and a vehicle according to an embodiment of the present disclosure. As illustrated in FIG. 8, the standard verification process includes the following steps.

At step 81, the vehicle generates a temporary vehicle public-private key pair.

At step 82, the vehicle sends a public key exchange request to the mobile terminal, and transmits a temporary vehicle public key and a vehicle ID (Vehicle_ID). A generation rule of Vehicle_ID can refer to the ICCOA protocol.

At step 83, the mobile terminal generates a temporary digital-vehicle-key public-private key pair. For example, the mobile terminal may generate a temporary public-private key pair through the key management element.

At step 84, the mobile terminal sends to the vehicle a response to public key exchange request and returns the temporary digital-vehicle-key public key and the digital vehicle key ID (KeyID). A generation rule of KeyID can refer to the ICCOA protocol.

At step 85, the vehicle generates vehicle authentication information, and the vehicle authentication information includes the temporary digital-vehicle-key public key, the temporary vehicle public key, and related information of KeyID. The vehicle may also sign the vehicle authentication information based on the vehicle private key.

At step 86, the vehicle sends a standard authentication request to the mobile terminal and transmits a vehicle authentication information signature to the mobile terminal.

At step 87, the mobile terminal verify the signature based on the vehicle public key, and the vehicle public key certificate has been issued to the mobile terminal in the key activating process. In this way, the mobile terminal can verify the signature of the vehicle by the vehicle public key, thereby verifying an identity of the vehicle and preventing counterfeit vehicles from obtaining information of the mobile terminal.

At step 88, in a case that the vehicle authentication information signature is verified successfully, the mobile terminal generates digital-vehicle-key authentication information, which can include the temporary digital-vehicle-key public key, the temporary vehicle public key and information related to the vehicle ID. After that, the mobile terminal can sign the digital-vehicle-key authentication information based on the digital-vehicle-key private key.

At steps 891 and 892, the mobile terminal generates a secure channel secret key and a fast authentication secret key using a KDF (key derivation function) algorithm based on a negotiated symmetric secret key. The vehicle terminal generates a secure channel secret key and a fast authentication secret key using the same secret key negotiation algorithm and the KDF algorithm. Both parties establish a secure channel based on the same secure channel secret key.

At step 810, the mobile terminal sends, based on the secure channel established, to the vehicle a response to standard authentication request and transmits to the vehicle the digital-vehicle-key authentication information signature.

At step 811, the vehicle queries the digital vehicle key ID internally according to the digital vehicle key ID transmitted by the mobile terminal, to obtain the digital-vehicle-key public key corresponding to the digital vehicle key ID. When the vehicle can query the digital-vehicle-key public key, step 815 is executed. When the vehicle cannot query the digital vehicle key ID and the corresponding digital-vehicle-key public key, the vehicle executes steps 812 to 814 based on the established secure channel, and the vehicle obtains the digital-vehicle-key public key of the friend key through steps 812 to 814.

At step 812, the vehicle sends a digital vehicle key data request to the mobile terminal, the digital vehicle key data request is used to obtain the friend key authentication information.

At step 813, the mobile terminal sends to the vehicle a response to digital vehicle key data request and returns the friend key authentication information.

At step 814, after the vehicle decrypt the friend key authentication information based on the secure channel secret key, the vehicle verifies a signature of the friend key authentication information based on an owner digital-vehicle-key public key. In response to the verification being successful, a friend digital-vehicle-key public key in the friend key authentication information is saved.

At step 815, the vehicle verifies the digital-vehicle-key authentication information signature transmitted by the mobile terminal based on the digital-vehicle-key public key corresponding to the digital vehicle key ID. In response to the verification being successful, the standard authentication is successful. After the standard authentication is passed, the vehicle and the mobile terminal may synchronously save the fast authentication secret key generated this time for subsequent fast authentication. For example, the mobile terminal may save the fast authentication secret key to an encryption white box element.

At step 816, after successful authentication, the vehicle sends a status condition report to the mobile terminal, to inform the mobile terminal of an authentication status of the vehicle. In some implementation scenarios, before sending the status condition report, the vehicle may perform reading and writing operations on service data of the mobile terminal based on the secure channel having been established already.

After the standard authentication, the mobile terminal may transmit an instruction based on the secure channel established to control the vehicle.

In the above technical solutions, the communication device is provided in the terminal device. The communication device detects whether the native system of the terminal device includes components for adapting the public protocol of the digital vehicle key, and communicates with the target communication party based on the public protocol in case of absence of at least one of the components in the native system. The target communication party is a participant of the public protocol.

Therefore, the terminal device can communicate with the target communication party through the communication device based on the public protocol, to implement the functions of the digital vehicle key based on the public protocol. In this way, the public protocol can be applied to various terminal devices, to expand the scope of application of the public protocol. Moreover, since the terminal devices that do not support the public protocol can also communicate through the communication device based on the public protocol, the functions of the digital vehicle key can be implemented. Therefore, since there is no need to configure the components for implementing the digital vehicle key based on a private protocol in the terminal device, the deployment costs of the digital vehicle key are reduced.

In another embodiment, a computer program product is also provided. The computer program product includes computer programs capable of being executed by a programmable device. The computer programs have a code portion for performing the method for processing data for the terminal device described above when executed by the programmable device.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A terminal device, comprising:

a communication device including a hardware processor, configured to:

detect whether a native system of the terminal device comprises components for adapting a public protocol of a digital vehicle key; and communicate with a target communication party using the public protocol in case of absence of at least one of the components in the native system;

wherein the target communication party is a participant of the public protocol;

wherein the terminal device including a hardware processor is configured to:

establish a secure channel with a vehicle using a digital key framework in response to initiating a key activating process using the communication device;

obtain a vehicle public key certificate using the secure channel;

verify the vehicle public key certificate using a vehicle server CA (certificate authority) certificate using a key manager of the communication device, and save the vehicle public key certificate after successful verification;

generate a digital-vehicle-key public-private key pair using the key manager, the digital-vehicle-key public-private key pair comprising a digital-vehicle-key public key and a digital-vehicle-key private key;

sign the digital-vehicle-key public key using a key management element certificate, to generate a digital-vehicle-key public key certificate, the key management element certificate comprising a terminal device server CA signature; and transmit the terminal device server CA certificate, the key management element certificate, and the digital-vehicle-key public key certificate to the vehicle, to enable the vehicle to sequentially verify the terminal device server CA certificate, the key management element certificate, and the digital-vehicle-key public key certificate, and save the digital-vehicle-key public key after successful verification.

2. The terminal device according to claim 1, wherein the communication device comprises:

a digital key application, for communicating with a vehicle server, and implementing functions of a vehicle manufacturer application specified in the public protocol;

a local application, for communicating with a terminal device server, and implementing functions of a terminal device manufacturer application specified in the public protocol;

a digital key element including at least one Application Programming Interface (API), for implementing functions of the digital key framework specified in the public protocol; and the key manager including at least one API, for implementing functions of a digital key program specified in the public protocol.

3. The terminal device according to claim 2, wherein the communication device comprises an encryption white box, configured to store data of the digital vehicle key.

4. The terminal device according to claim 2, wherein the local application communicate with the terminal device server using a terminal device service element in the vehicle server.

5. The terminal device according to claim 2, wherein the public protocol is a public protocol based on certificate authentication, the target communication party comprises the vehicle server and the terminal device server.

6. The terminal device according to claim 5, wherein the terminal device, in response to receiving a key sharing request, communicates with the vehicle server via the digital key application and communicate with the terminal device server via the local application, rendering that an authentication step for key sharing is completed, and a shared digital vehicle key is obtained.

7. The terminal device according to claim 5, wherein the public protocol is a Car Connectivity Consortium (CCC) protocol or an Intelligent Car Connectivity Open Alliance (ICCOA) protocol.

8. The terminal device according to claim 1, wherein the target communication party comprises a vehicle.

9. The terminal device according to claim 8, wherein the terminal device establishes a secure channel by performing public protocol based communication with the vehicle through the communication device, and send a target control instruction to the vehicle through the secure channel, wherein the target control instruction is configured to control the vehicle to implement a target action.

10. A method of processing data for a terminal device, comprising:

detecting whether a native system of the terminal device comprises components for adapting a public protocol of a digital vehicle key; and communicating with a target communication party using the public protocol in case of absence of at least one of the components in the native system, wherein the target communication party is a participant of the public protocol;

establishing a secure channel with a vehicle using a digital key framework in response to initiating a key activating process using a communication device;

obtaining a vehicle public key certificate using the secure channel;

verifying the vehicle public key certificate using a vehicle server CA (certificate authority) certificate using at least one Application Programming Interface (API) of a key manager of the communication device, and saving the vehicle public key certificate after successful verification;

generating a digital-vehicle-key public-private key pair using the key manager, the digital-vehicle-key public-private key pair comprising a digital-vehicle-key public key and a digital-vehicle-key private key;

signing the digital-vehicle-key public key using a key management element certificate, to generate a digital-vehicle-key public key certificate, the key management element certificate comprising a terminal device server CA signature; and transmitting the terminal device server CA certificate, the key management element certificate, and the digital-vehicle-key public key certificate to the vehicle, to enable the vehicle to sequentially verify the terminal device server CA certificate, the key management element certificate, and the digital-vehicle-key public key certificate, and saving the digital-vehicle-key public key after successful verification.

11. The method according to claim 10, wherein the public protocol is a public protocol based on certificate authentication, the target communication party comprises a vehicle server and a terminal device server.

12. The method according to claim 11, wherein communicating with the target communication party using the public protocol comprises:

in response to receiving a key sharing request, communicating with the vehicle server via a digital key application in the communication device, and communicating with the terminal device server via a local application in the communication device, rendering that an authentication step for key sharing is completed, and a shared digital vehicle key is obtained.

13. The method according to claim 10, wherein the target communication party comprises a vehicle.

14. The method according to claim 13, wherein communicating with the target communication party using the public protocol comprises:

establishing a secure channel by performing public protocol based communication with the vehicle through the communication device; and sending a target control instruction to the vehicle through the secure channel, wherein the target control instruction is configured to control the vehicle to implement a target action.

15. The method according to claim 10, further comprising:

storing data of the digital vehicle key by an encryption white box of the communication device.

16. A non-transitory computer-readable storage medium having instructions stored thereon, wherein, when the instructions are executed by a processor of a terminal device, a method of processing data is implemented, and the method comprises:

detecting whether a native system of the terminal device comprises components for adapting a public protocol of a digital vehicle key; and communicating with a target communication party using the public protocol in case of absence of at least one of the components in the native system, wherein the target communication party is a participant of the public protocol;

establishing a secure channel with a vehicle using at least one Application Programming Interface (API) of a digital key framework in response to initiating a key activating process through a communication device;

obtaining a vehicle public key certificate using the secure channel;

verifying the vehicle public key certificate using a vehicle server CA (certificate authority) certificate through at least one API of a key manager of the communication device, and saving the vehicle public key certificate after successful verification;

generating a digital-vehicle-key public-private key pair through the key manager, wherein the digital-vehicle-key public-private key pair comprises a digital-vehicle-key public key and a digital-vehicle-key private key;

signing the digital-vehicle-key public key using a key management element certificate, to generate a digital-vehicle-key public key certificate, wherein the key management element certificate comprises a terminal device server CA signature; and transmitting the terminal device server CA certificate, the key management element certificate, and the digital-vehicle-key public key certificate to the vehicle, to enable the vehicle sequentially verifies the terminal device server CA certificate, the key management element certificate, and the digital-vehicle-key public key certificate, and saving the digital-vehicle-key public key in a case of successful verification.

17. The storage medium according to claim 16, wherein the public protocol is a public protocol based on certificate authentication, the target communication party comprises a vehicle server and a terminal device server, and communicating with the target communication party using the public protocol comprises:

in response to receiving a key sharing request, communicating with the vehicle server via a digital key application in the communication device, and communicating with the terminal device server via a local application in the communication device, rendering that an authentication step for key sharing is completed, and a shared digital vehicle key is obtained.

18. The storage medium according to claim 16, wherein the target communication party comprises a vehicle, and communicating with the target communication party using the public protocol comprises:

establishing a secure channel by performing public protocol based communication with the vehicle through a terminal device; and sending a target control instruction to the vehicle through the secure channel, wherein the target control instruction is configured to control the vehicle to implement a target action.

19. The storage medium according to claim 16, wherein the method further comprises:

storing data of the digital vehicle key by an encryption white box of the communication device.

* * * * *